(12) United States Patent
Kramer et al.

(10) Patent No.: US 7,132,467 B2
(45) Date of Patent: Nov. 7, 2006

(54) STABILIZATION OF POLYOLEFINS IN PERMANENT CONTACT WITH CHLORINATED WATER

(75) Inventors: Erich Kramer, Basel (CH); Alfred Georges Oertli, Reinach (CH); Markus Grob, Auf der Bischofföhe (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 157 days.

(21) Appl. No.: 10/503,411

(22) PCT Filed: Jan. 23, 2003

(86) PCT No.: PCT/EP03/00648

§ 371 (c)(1),
(2), (4) Date: Jul. 28, 2004

(87) PCT Pub. No.: WO03/064511

PCT Pub. Date: Aug. 7, 2003

(65) Prior Publication Data

US 2005/0148700 A1 Jul. 7, 2005

(30) Foreign Application Priority Data

Jan. 31, 2002 (EP) ................... 02405059

(51) Int. Cl.
*C08J 3/00* (2006.01)
*C08K 5/15* (2006.01)
*C08K 5/34* (2006.01)
*C08L 57/02* (2006.01)
*F16L 11/00* (2006.01)

(52) U.S. Cl. ................ 524/100; 138/118; 138/125; 138/178; 405/38; 405/129.75; 405/302.7; 524/86; 524/90; 524/99; 524/87; 524/92; 524/102; 524/103; 524/114; 524/178; 524/179; 524/182; 524/284; 524/290; 524/499; 524/570

(58) Field of Classification Search ............ 138/118, 138/125, 178; 524/82, 83, 86, 91, 99, 100, 524/178, 179, 182, 284, 290, 87, 92, 102, 524/103, 114, 499, 570; 405/129.75, 38, 405/302.7
See application file for complete search history.

(56) References Cited

U.S. PATENT DOCUMENTS

| 4,179,432 A | 12/1979 | Molt ................... 260/45.75 |
| 4,746,692 A | 5/1988 | Hayden ................... 524/100 |
| 5,770,643 A | 6/1998 | Wehner et al. ............. 524/91 |

FOREIGN PATENT DOCUMENTS

| EP | 0736569 | 10/1996 |
| FR | 2622590 | 5/1989 |
| GB | 2305180 | 4/1997 |

*Primary Examiner*—Patrick D. Niland
(74) *Attorney, Agent, or Firm*—Tyler A. Stevenson

(57) ABSTRACT

Polyolefin mouldings that have excellent stability on permanent contact with chlorinated water comprise, as stabilizer, at least a compound selected from the group consisting of i) an epoxidized fatty acid having 3 to 22 carbon atoms or an aklyl ester thereof having 1 to 18 carbon atoms; and/or ii) an organotin compound; and/or iii) a compound containing at least one radical of the formula A or B.

8 Claims, No Drawings

STABILIZATION OF POLYOLEFINS IN PERMANENT CONTACT WITH CHLORINATED WATER

The present invention relates to compositions comprising a polyolefin, especially a polyolefin pipe, which is in permanent contact with chlorinated water, and a stabilizer selected from the group consisting of an epoxidized fatty acid or ester thereof and/or an organotin compound.

In the fifties, polyethylene grades were launched globally for use in pipe applications. This success story is still being told by the industry, and consumers continue to enjoy the benefits of this technology. While guaranteed lifetimes of pressure pipes in use is roughly 50 years, it is commonly accepted that a well designed and manufactured HDPE/MDPE pressure pipe would last as long as 100 years without failures. With ever-growing world populations and intensifying pollution, it has become increasingly difficult supplying people with their daily demand for adequately pure drinking water. Water-works in many regions of the world cannot depend of filtration methods alone for preparing a flawless water quality but must adhere to chlorination for dealing with germs and microorganisms.

In extended laboratory studies related to the influence of chlorinated water on the lifetime expectation of pressure pipes conducted over the last seven years it has become evident, that even a very small concentration of chlorine in the water can have a detrimental effect on the lifetime expectancy of pressure pipes. Pipe exposed to non-chlorinated water show longer lifetimes estimated to be 10–30 times longer than the same pipes exposed to chlorinated water. This finding lead to some concerns among resin and pipe producers as well as water supply management.

GB-A-2 305 180 describes a polyolefin moulding composition which has particularly good stability in permanent contact with water. The stabilizer mixtures used are a selected mixture comprising an organic phosphite or phosphonite and a specially selected group of sterically hindered phenols or a certain group of sterically hindered amines. In addition, a selected three-component mixture comprising a phosphite or phosphonite, a phenolic antioxidant and a certain group of sterically hindered amines is particularly suitable as stabilizer for polyolefin mouldings which are in permanent contact with water.

These known stabilizer mixtures do not satisfy in every respect the high requirements which a stabilizer mixture is required to meet, especially with regard to polyolefin mouldings which are in permanent contact with chlorinated water.

It has now been found that a specific group of compounds selected from the group consisting of an epoxidized fatty acid or ester thereof and/or an organotin compound is particularly suitable as stabilizer for polyolefin mouldings which are in permanent contact with chlorinated water.

The present invention therefore provides compositions comprising a) a polyolefin which is in permanent contact with chlorinated water, and b) as stabilizer at least a compound selected from the group consisting of i) an epoxidized fatty acid having 3 to 22 carbon atoms or an alkyl ester thereof having 1 to 18 carbon atoms; and/or ii) an organotin compound; and/or iii) a compound containing at least one radical of the formula A or B

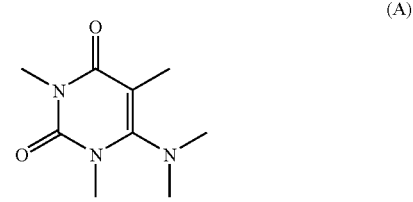

(A)

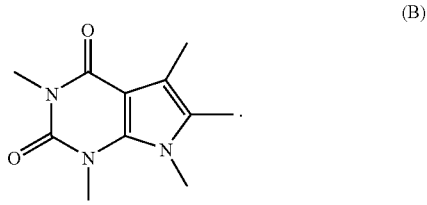

(B)

The epoxidized fatty acids and fatty acid alkyl esters used as component (b)(i) comprise, for example, epoxidized oleic acid, linoleic acid, linolenic acid, erucacic acid, ricinoleic acid or brassidic acid, which are free or esterified with monohydric or polyhydric alcohols, such as methanol, butanol, lauryl alcohol, octyl alcohol as well as pentaerythritol, glycerol, ethylene glycol, propylene glycol, butylenes glycol, neopentyl glycol, mannitol or sorbitol. The said polyhydric alcohols can be completely or partially esterified. Component (b)(i) also comprises mixtures of epoxidized higher fatty acid esters, such as epoxidized cotton seed oil, castor oil, sunflower oil or olive oil, epoxidized tallow or in particular epoxidized soyabean oil or linseed oil.

Such compounds are available commercially, for example various soyabean oils are available under the trade name Paraplex G-60 (RTM), Paraplex G-61 (RTM), Paraplex G-62 (RTM), Flexol (RTM), EPO (RTM) or Reoplast 392 (RTM). The epoxidized octyl stearate (CAS: 106-84-3) is available under the trade name Drapex (RTM) (Crompton Vinyl Additives GmbH, Lampertheim, Germany).

Component (b)(i) is preferably a mixture of epoxidized fatty acid esters, for example epoxidized castor oil or sunflower oil and in particular epoxidized soyabean oil or linseed oil.

Component (b)(i) is most preferably an ester of an epoxidized fatty acid having 16 to 22 carbon atoms or an alkyl ester thereof having 6 to 10 carbon atoms. Of special interest is epoxidized octyl stearate.

Component (b)(ii) is preferably an organotin compound of the formula I to IV

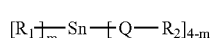  (I)

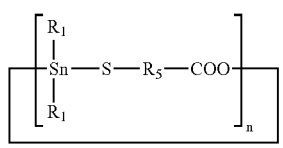  (II)

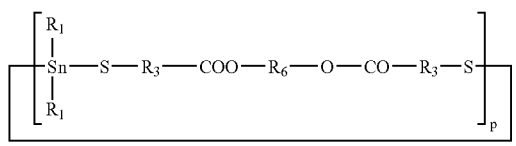  (III)

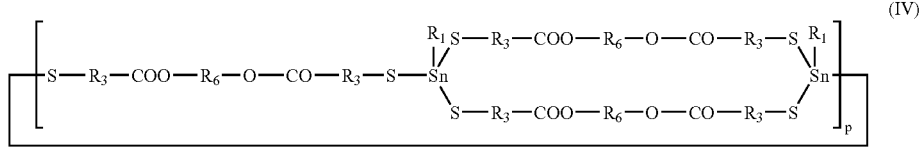  (IV)

wherein
$R_1$ is $C_1$–$C_{12}$alkyl or $C_1$–$C_8$alkoxycarbonylethyl,
Q is —S— or —O—CO—, and,
if Q is —S—,
$R_2$ is $C_8$–$C_{18}$alkyl, a radical —$R_3$—COO—$R_4$ or —$(CH_2)_2$—O—CO—$R_4$, or,
if Q is —O—CO—,
$R_2$ is $C_1$–$C_{18}$alkyl, $C_2$–$C_{18}$alkenyl, phenyl which is unsubstituted or substituted by $C_1$–$C_4$alkyl;
$R_3$ is methylene, ethylene or o-phenylene,
$R_4$ is $C_5$–$C_{18}$alkyl,
$R_5$ methylene, ethylene or o-phenylene,
$R_6$ is $C_2$–$C_4$alkylene or $C_4$–$C_8$alkylene which is interrupted by oxygen,
m is 1 or 2,
n is a number from 1 to 6, and
p is a number from 1 to 3.

The abbreviated form —COO— or $CO_2$— used above, throughout the description and in the claims denotes the grouping

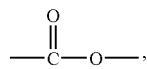

and —O—CO— or —OCO denotes the grouping

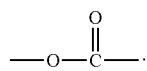

Alkyl having up to 18 carbon atoms is a branched or straight-chain radical such as methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl (tert-octyl), 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl. One of the preferred meanings of $R_1$ is e.g. $C_1$–$C_{12}$alkyl, for example $C_4$–$C_8$alkyl. A particularly preferred meaning of $R_4$ is $C_5$–$C_{18}$alkyl.

$C_1$–$C_8$alkoxycarbonylethyl is $C_1$–$C_8$alkyl-O—CO—$CH_2$—$CH_2$—, typically including methoxycarbonylethyl, ethoxycarbonylethyl, n-propoxycarbonylethyl, isopropoxycarbonylethyl, butoxycarbonylethyl, pentoxycarbonylethyl, hexyloxycarbonylethyl, heptyloxycarbonylethyl or octyloxycarbonylethyl.

Alkenyl of 2 to 18 carbon atoms is a branched or straight chain radical such as vinyl, propenyl, isopropenyl, 2-butenyl, 3-butenyl, isobutenyl, n-2,4-pentadienyl, 3-methyl-2-butenyl, n-2-octenyl, n-2-dodecenyl, isododecenyl, oleyl, n-2-octadecenyl or n-4-octadecenyl. Alkenyl of 8 to 18 carbon atoms is preferred.

$C_1$–$C_4$alkyl-substituted phenyl containing preferably 1 to 3, in particular 1 or 2, alkyl groups is typically o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_2$–$C_4$alkylene is a branched or straight chain radical such as methylene, ethylene, propylene, butylene or 2-methylpropylene.

$C_4$–$C_8$alkylene which is interrupted by oxygen is typically —$CH_2$—$CH_2$—O—$CH_2$—$CH_2$—, —$CH_2$—$CH_2$—$CH_2$—O—$CH_2$—$CH_2$—$CH_2$—, —$CH_2$—$CH_2$—O—$(CH_2)_4$— or —$(CH_2)_4$—O—$(CH_2)_4$—, preferably —$CH_2$—$CH_2$—O—$CH_2$—$CH_2$—.

Component (b)(ii) may also be a mixture of different organotin compounds of formulae I to IV.

Interesting compositions are those comprising as component (b)(ii) at least one organotin compound of the formula I to IV, wherein
$R_1$ is $C_4$–$C_8$alkyl,
if Q is —S—,
$R_2$ is a radical —$R_3$—COO—$R_4$, or, if Q is —O—CO—,
$R_2$ is $C_7$–$C_{11}$alkyl;
$R_3$ is methylene or ethylene,
$R_4$ is $C_8$–$C_{14}$alkyl,
$R_5$ is ethylene,
$R_6$ is ethylene,
m is 1 or 2,
n is a number from 1 to 4, and
p is 1 or 2.

Also preferred are compositions comprising as component (b)(ii) at least an organotin compound of the formula I or III.

Particularly preferred organotin compounds of the formula I are:
$(CH_3CH_2CH_2CH_2)_2Sn(SCH_2CO_2CH_2CH(CH_2CH_3)$ $CH_2CH_2CH_2CH_3)_2$[dibutyltin-bis(2-ethylhexylthioglycolate)],
$(n-C_8H_{17})_2Sn(SCH_2CO_2CH_2CH(CH_2CH_3)$ $CH_2CH_2CH_2CH_3)_2$[dioctyltin-bis(2-ethylhexylthioglycoate)],
$(CH_3CH_2CH_2CH_2)Sn(SCH_2CO_2CH_2CH(CH_2CH_3)$ $CH_2CH_2CH_2CH_3)_3$[monobutyltin-tris(2-ethylhexylthioglycolate)], or
$(CH_3CH_2CH_2CH_2)_2Sn(O—CO—C_7H_{15})_2$[dibutyltin-bis (isooctoate)], Organotin compounds are known and can be prepared by known methods. Thus, for example, the organotin compounds are described in Houben-Weyl, "Methoden der Organischen Chemie", Georg Thieme Verlag, Stuttgart 1978, Vol. 13/6, p. 294ff; A. K. Sawyer, "Organotin Compounds", Marcel Dekker Inc., New York 1971, Vol. I, Chapters II and III and Vol. II, p. 264; and W. P. Neumann, "Die Organische Chemie des Zinns", Ferdinand Enke Verlag, Stuttgart 1967, p. 131. Some organotin compounds are commercially available from, for example, Crompton Vinyl Additives GmbH, Lampertheim, Germany.

Component (b)(iii) is preferably a compound of the formula A1 or B1

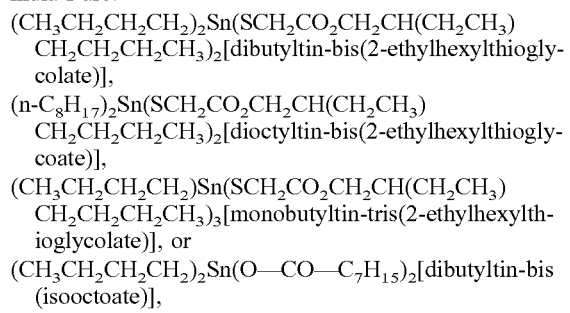

(A1)

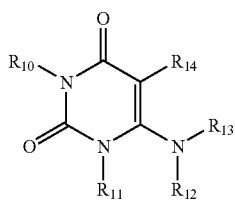

(B1)

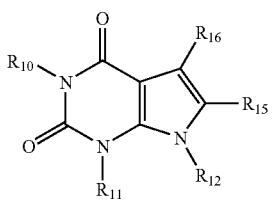

wherein
$R_{10}$, $R_{11}$, $R_{12}$ and $R_{13}$, independently of one another, are hydrogen, $C_1$–$C_{10}$alkyl, $C_2$–$C_{12}$alkyl which is interrupted by oxygen; hydroxyl-substituted $C_1$–$C_{10}$alkyl; $C_3$–$C_6$alkenyl, $C_5$–$C_8$cycloalkyl, phenyl or $C_7$–$C_8$phenylalkyl,
$R_{14}$ is hydrogen, $C_1$–$C_{10}$alkyl or phenyl, and
$R_{15}$ and $R_{18}$, independently of one another, are hydrogen, $C_1$–$C_{10}$alkyl, phenyl or $C_7$–$C_9$phenylalkyl.

Alkyl having up to 10 carbon atoms is a branched or straight-chain radical such as methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl (tert-octyl), 1-methylheptyl, 3-methylheptyl, n-octyl, 2-ethylhexyl, 1,1,3-trimethylhexyl, 1,1,3,3-tetramethylpentyl, nonyl or decyl. One of the preferred meanings of $R_{10}$, $R_{11}$, $R_{12}$, $R_{13}$, $R_{14}$, $R_{15}$ and $R_{16}$ is e.g. $C_1$–$C_8$alkyl, for example $C_1$–$C_6$alkyl. A particularly preferred meaning of $R_{10}$, $R_{11}$, $R_{12}$, $R_{13}$, $R_{14}$, $R_{15}$ and $R_{16}$ is $C_1$–$C_4$alkyl.

Alkyl having 2 to 12 carbon atoms which is interrupted by oxygen can be mono- or polyinterrupted and is, for example, $CH_3CH_2$—O—$CH_2CH_2$—, $CH_3CH_2$—(O—$CH_2CH_2$—)$_2$O—$CH_2CH_2$— or $CH_3CH_2$—(O—$CH_2CH_2$—)$_3$O—$CH_2CH_2$—.

Hydroxyl-substituted alkyl having up to 10 carbon atoms which preferably contains 1 to 3, in particular 1 or 2, hydroxyl groups, is a branched or unbranched radical, for example 2-hydroxyethyl, 2-hydroxypropyl, 3-hydroxypropyl, 2,3-dihydroxypropyl, 2-hydroxybutyl, 2-hydroxypentyl, 2-hydroxypentyl, 2-hydroxyhexyl, 2-hydroxyheptyl, 2-hydroxyoctyl or 2,5,6-trihydroxyhexyl. Preference is given to 2-hydroxyethyl.

$C_5$–$C_8$Cycloalkyl is for example cyclopentyl, cyclohexyl, cycloheptyl or cyclooctyl. Preference is given to cyclohexyl.

$C_7$–$C_9$Phenylalkyl is for example benzyl, α-methylbenzyl, α,α-dimethylbenzyl, 2-phenylethyl, 2-methylbenzyl, 3-methylbenzyl, 4-methylbenzyl, 2,4-dimethylbenzyl or 2,6-dimethylbenzyl.

Also preferred are compositions comprising as component (b)(iii) a compound of the formula A1 or B1, wherein
$R_{10}$, $R_{11}$, $R_{12}$ and $R_{13}$, independently of one another, are hydrogen, $C_1$–$C_4$alkyl phenyl or benzyl,
$R_{14}$ is hydrogen, methyl or ethyl, and
$R_{15}$ and $R_{16}$, independently of one another, are hydrogen, $C_1$–$C_4$alkyl, phenyl or benzyl.

The compounds containing at least one radical of the formula A or B are known and can be prepared by known methods as disclosed for example in U.S. Pat. No. 5,770,643.

Component (b) is suitable for stabilizing polyolefins which are in permanent contact with chlorinated water.

Examples of Polyolefins Are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

Homopolymers and copolymers from 1.)–4.) may have any stereostructure including syndiotactic, isotactic, hemi-isotactic or atactic; where atactic polymers are preferred. Stereoblock polymers are also included.

Preferred polyolefins are polyethylene, polypropylene or polybutylene or a copolymer thereof with a monoolefin or diolefin.

Particular mention should be made of the action of component (b) against oxidative and thermal degradation of polyolefins, as occur during the processing of thermoplasts. The polyolefins stabilized in this way are in addition distinguished by excellent chemical resistance to chlorinated water with which they are in permanent contact.

Component (b) is preferably added to the polyolefin to be stabilized in an amount of from 0.02 to 5%, in particular from 0.05 to 1%, for example 0.05 to 0.6%, based on the weight of component (a).

In addition to components (a) and (b) the novel compositions may comprise further costabilizers (additives) such as, for example, the following:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylhenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocooherols, for example α-tocopherol, β-tocopherol, γ-tocopherol, δ-tocopherol and mixtures thereof (vitamin E).

1.5. Hydroxylated thiodichenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tertbutyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3, 5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1, 5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or poly-hydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tertbutyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicylohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-disec-butyl-p-phenylenediamine, diphenylamine, N-allyidiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyidiphenylamines, a mixture of mono- and dialkylated isopropyl/isohexyl-diphenylamines, a mixture of mono- and dialkylated tert-butyidiphenylamines, 2,3-dihydro-3,3-dimethyl-4H-1,4-benzothiazine, phenothiazine, a mixture of mono- and dialkylated tertbutyl/tert-octylphenothiazines, a mixture of mono- and dialkylated tert-octylphenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl- 2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotri-azol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tertbutylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylene-diamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. (192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-

1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethyl-phenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tertbutyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptynitrone, N-lauryl-alpha-undecylnitrone, N-tetradecyl-alpha-tridecynitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecyinitrone, N-heptadecyl-alpha-hepta-decylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

With the exception of the fillers and reinforcing agents (point 12 in the list), the costabilizers are added to the polyolefin in, for example, in concentrations of 0.01 to 10%, in particular 0.05 to 5%, for example 0.05 to 1%, relative to the total weight of the polyolefin to be stabilized.

The fillers and reinforcing agents (item 12 in the list), for example talc, calcium carbonate, mica or kaolin, are added to the polyolefins in concentrations, for example, of from 0.01 to 40%, based on the overall weight of the polyolefins to be stabilized.

The fillers and reinforcing agents (item 12 in the list), for example metal hydroxides, especially aluminium hydroxide or magnesium hydroxide, are added to the polyolefins in concentrations, for example, of from 0.01 to 60%, based on the overall weight of the polyolefins to be stabilized.

Carbon black as filler is added to the polyolefins in concentrations, judiciously, of from 0.01 to 5%, based on the overall weight of the polyolefins to be stabilized.

Glass fibers as reinforcing agents are added to the polyolefins in concentrations, judiciously, of from 0.01 to 20%, based on the overall weight of the polyolefins to be stabilized.

Preferred further additives are phenolic antioxidants, light-stabilizers and/or processing stabilizers. Preferred light-stabilizers are sterically hindered amines (HALS; item 2.6 of the list). Preferred processing stabilizers are phosphites and phosphonites (item 4 of the list).

Further preferred compositions comprise in addition to components (a) and (b) further additives as well, especially alkaline earth metal salts of higher fatty acids, for example calcium stearate, or metal deactivators, for example N,N'-bis(3,5-di-tert-butyl-4-hydroxyphenylpropionyl)hydrazine [Irganox MD 1025 (RTM) (Ciba Specialty Chemicals Inc.) or N,N'-bis[2-(3-[3,5-di-tert-butyl-4-hydroxyphenyl]propionyloxy)ethyl]oxamide [Naugard XL-1 (RTM) (Uniroyal).

Component (b) and any further additives used are incorporated into the polyolefin by known methods, for example before or during moulding or alternatively by applying the dissolved or dispersed component (b) to the polyolefin, if necessary with subsequent evaporation of the solvent. Component (b) can also be added to the polyolefins to be stabilized in the form of a masterbatch in which this component is present, in a concentration of 2.5 to 25% by weight.

Component (b) can also be added before or during polymerization or before crosslinking.

Component (b), with or without further additives, can be incorporated in pure form or encapsulated in waxes, oils or polymers into the polyolefin that is to be stabilized.

Component (b), with or without further additives, can also be sprayed onto the polyolefin to be stabilized. It is capable of diluting other additives (for example the conventional additives indicated above) or melts thereof, so that they can also be sprayed onto the polyolefin to be stabilized together with these additives. A particularly advantageous procedure is addition before spraying, during deactivation of the polymerization catalysts, in which case for example, the steam for deactivation can be used for the spraying.

In the case of polyolefins polymerised in spherical form, it may be advantageous, for example, to apply component (b), if desired together with other additives, by spraying.

The polyolefins stabilized in this way can be employed in a wide variety of forms, in particular as thick-walled polyolefin mouldings, which are in permanent contact with chlorinated water, for example pipes, geomembranes, tapes, profiles or tanks.

The preferred thick-layer polyolefin mouldings have a layer thickness of from 1 to 50 mm, in particular from 1 to 30 mm, for example from 2 to 10 mm.

The present invention also relates to a process for stabilizing polyolefin mouldings which are in permanent contact with chlorinated water, which comprises incorporating in or applying to said mouldings at least a component (b).

Preferably, the polyolefin moulding is a pipe or geomembrane.

The term geomembrane is taken to mean sheeting which is used, for example, in landfill sites and must have, for example, a life of up to 300 years.

A preferred embodiment of the present invention is therefore the use of component (b) for stabilizing polyolefin mouldings which are in permanent contact with chlorinated water.

The examples below illustrate the invention in greater detail. The parts and percentages are by weight.

EXAMPLE 1

Stabilization of Polyolefin Pipes in Permanent Contact with Chlorinated Water

Pipe formulations are derived from originally unstabilized base resin of a non-colored and commercially available PE100 pipe grade [CRP 100 from Basell (formerly Elenac), Frankfurt, Germany]. All formulations contain 0.10% calciumstearate (Shell, Holland), 0.074% $TiO_2$ (Kronos 2257 from KRONOS International, Inc., Leverkusen, Germany) as well as 0.120% Microlen Blue 4 GNP (Ciba Specialty Chemicals Inc., Basel, Switzerland) and 0.038% Microlen Red RT-195 (Ciba Specialty Chemicals Inc., Basel, Switzerland). The stabilizers according to Table 1 of the instant invention are added in powder form on a 150 l mixer Papenmeier TSHKV 150 (Günther Papenmeier KG, Paderborn, Germany) for 8 minutes. The powder mixtures are extruded on a collin twin scew extruder (Dr. Collin GmbH, Ebersberg, Germany) with a diameter of 35 mm and a length of the screws of 32D. The compounds are extruded under nitrogen with 140 rpm. The four dies have a diameter of each 3 mm. The compounds are extruded at 230° C. with a mass temperature of 239° C. The melt pressure is 66 bar. The pipes are extruded on a single screw extruder from Krauss Maffei (Krauss Maffei, Siegburg, Germany) with a diamter of 60 mm and and L/D of 30 equipped with a dosing station from Motan A G (Isny im Allgaeu, Germany) and a vacuum calibration for sizing the pipes. The applied vacuum is 0.6 bar. The pipe dimension has 12 mm outer diameter and a wall thickness of 2.3 mm. The temperature profile chosen is 50, 185, 190, 195, 200° C. which results with a maximum mass temperature of 240° C. and a mass pressure at the die of around 360 bar. The line speed is 6.7 to 6.8 m/min or around 30 kg/hour. From all extrusions the first 30 meters are discarded.

All pipes were tested for uniformity of formulation and production using visual inspection, standard oxidation inducting time (OIT, in accordance to ASTM 3895-98) methods throughout the pipe geometry, and measurements of wall thickness.

The testing of pipes with chlorinated water was performed with a special chlorine circulation loop equipment. All components in the loop including fittings were made from titanium, PVDF and PTFE. In the chlorine dosage unit, PE, PVC and PP components were used. The chlorine generation equipment used sodium hypochlorite.

During the test period, the average value of the chlorine concentration at the inlet of the pipe has been 3±0.1 ppm. The volume flow was 54 liter per hour, which corresponds to a flow rate of 0.3 m/s for a 12×2 mm pipe. 10% of the total water volume was exchanged continuously every hour.

Based on the results of the testing with 3 ppm chlorinated water at 105° C., 95° C. and 85° C. it is possible to derive Arrhenius calculations and the corresponding life time predictions for the tested formulations in accordance to ISO TR 9080.

TABLE 1

| Example | Stabilizer | Temperature in °C. For 50 years operation | Life time prediction Years when operated at 20° C. |
|---|---|---|---|
| 1a[a)] | 0.10% Irganox 1010[c)]<br>0.20% Irgafos 168[d)] | 39.3 | 781 |
| 1b[a)] | 0.10% Irganox 1010[c)]<br>0.20% Irgafos 168[d)]<br>0.20% Chimassorb 2020[e)] | 21.3 | 57 |
| 1c[b)] | 0.10% Irganox 1010[c)]<br>0.20% Irgafos 168[d)]<br>0.20% Chimassorb 2020[e)]<br>0.10% Drapex[f)] | 41.5 | 1295 |
| 1d[b)] | 0.10% Irganox 1010[c)]<br>0.20% Irgafos 168[d)]<br>0.20% Chimassorb 2020[e)]<br>0.10% Irgastab 17 MOK[g)] | 43.4 | 1322 |

[a)]Comparison example.

[b)]Example according to the invention.

[c)]Irganox 1010 (RTM) (Ciba Specialty Chemicals) is pentaerythrityl ester of 3-(3,5-di-tert-butyl-4-hydroxyphenylpropionic acid of the formula AO-1

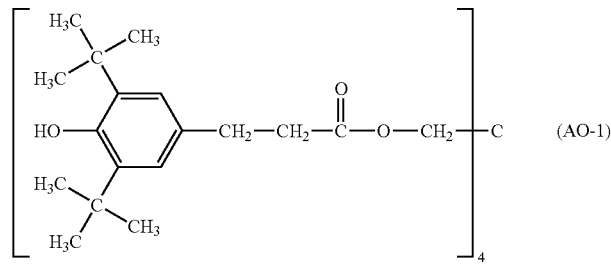

[d)]Irgafos 168 (RTM) (Ciba Specialty Chemicals) is tris(2,4-di-tert-butylphenyl)phosphit.

[e)]Chimassorb 2020 (RTM) (Ciba Specialty Chemicals) is a block oligomeric hindered amine light stabilizer of the formula

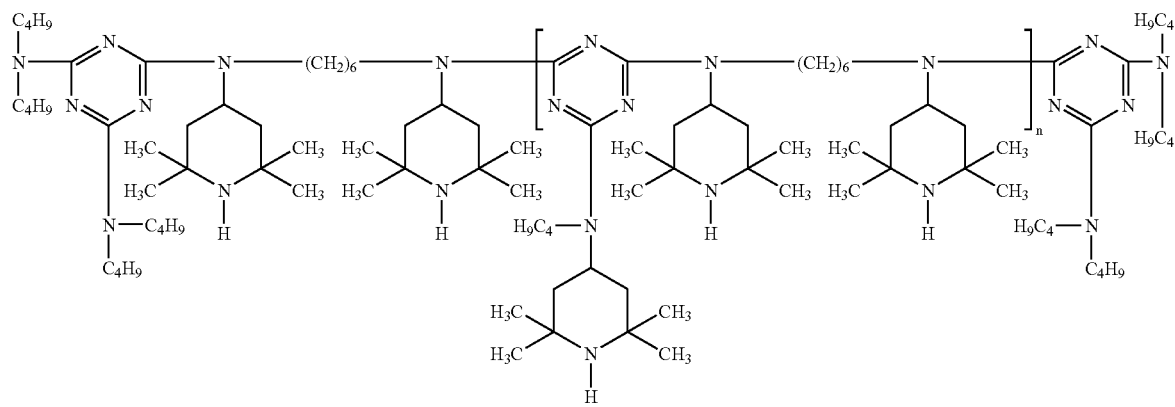

with a molecular weight of 2600–3400. The preparation of Chimassorb 2020 is disclosed for example in Example 10 of U.S. Pat. No. 6,046,304.

[f)]Drapex (RTM) (Crompton Vinyl Additives GmbH, Lampertheim, Germany) is an epoxidized octyl stearate (CAS: 106-84-3).

[g)]Irgastab 17 MOK (RTM) (Crompton Vinyl Additives GmbH, Lampertheim, Germany) is dioctyltin-bis(2-ethylhexylthioglycolate) of the formula T-1

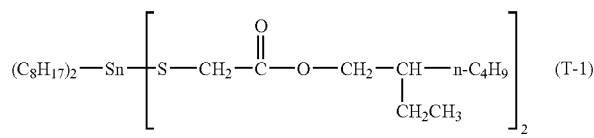

What is claimed is:

1. A composition comprising
   a) a polyolefin which is in permanent contact with chlorinated water, and
   b) as stabilizer at least a compound selected from the group consisting of
      i) an epoxidized fatty acid having 3 to 22 carbon atoms or an alkyl ester thereof having 1 to 18 carbon atoms; and
      iii) a compound containing at least one radical of the formula A1 or B1

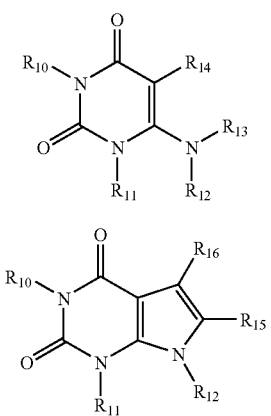

wherein $R_{10}$, $R_{11}$, $R_{12}$ and $R_{13}$, independently of one another, are hydrogen, $C_1$–$C_{10}$alkyl, $C_2$–$C_{12}$alkyl which is interrupted by oxygen; hydroxyl-substituted $C_1$–$C_{10}$alkyl; $C_3$–$C_6$alkenyl, $C_5$–$C_8$cycloalkyl, phenyl or $C_7$–$C_9$phenylalkyl, $R_{14}$ is hydrogen, $C_1$–$C_{10}$alkyl or phenyl, and $R_{15}$ and $R_{16}$, independently of one another, are hydrogen, $C_1$–$C_{10}$alkyl, phenyl or $C_7$–$C_9$phenylalkyl.

2. A composition according to claim 1, wherein component (b)(i) is an ester of an epoxidized fatty acid having 16 to 22 carbon atoms or an alkyl ester thereof having 6 to 10 carbon atoms.

3. A composition according to claim 1, wherein component (a) is polyethylene, polypropylene or polybutylene or a copolymer thereof with a monoolefin or diolefin.

4. A composition according to claim 1, wherein component (b) is present in an amount of 0.02 to 5%, based on the weight of component (a).

5. A composition according to claim 1, comprising in addition, besides components (a) and (b), further additives.

6. A composition according to claim 5, comprising as further additives phenolic antioxidants, light-stabilizers and/or processing stabilizers.

7. A process for stabilizing polyolefin mouldings which are in permanent contact with chlorinated water, which comprises incorporating in or applying to said mouldings at least a component (b) according to claim 1.

8. A process according to claim 7, wherein the polyolefin moulding is a pipe or geomembrane.

* * * * *